L. F. CHANEY.
METHOD OF SCALING THERMOMETER TUBES AND THE LIKE.
APPLICATION FILED DEC. 20, 1918.
1,391,878.
Patented Sept. 27, 1921.
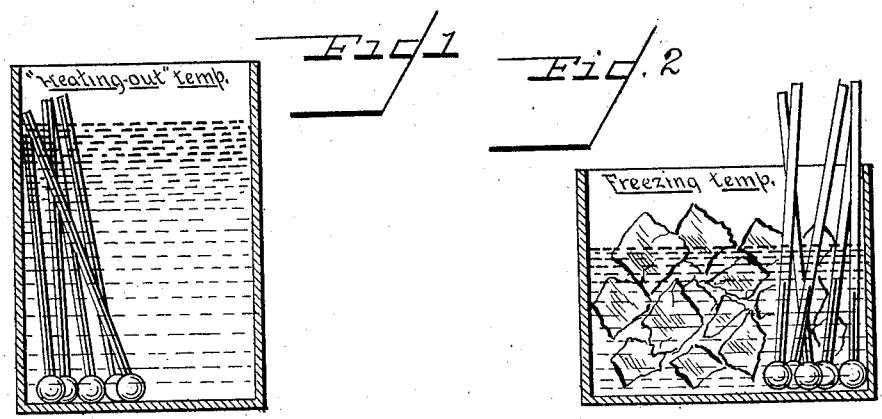
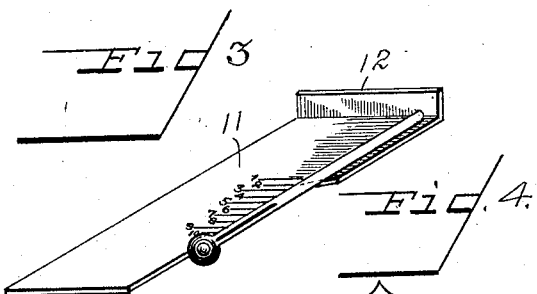
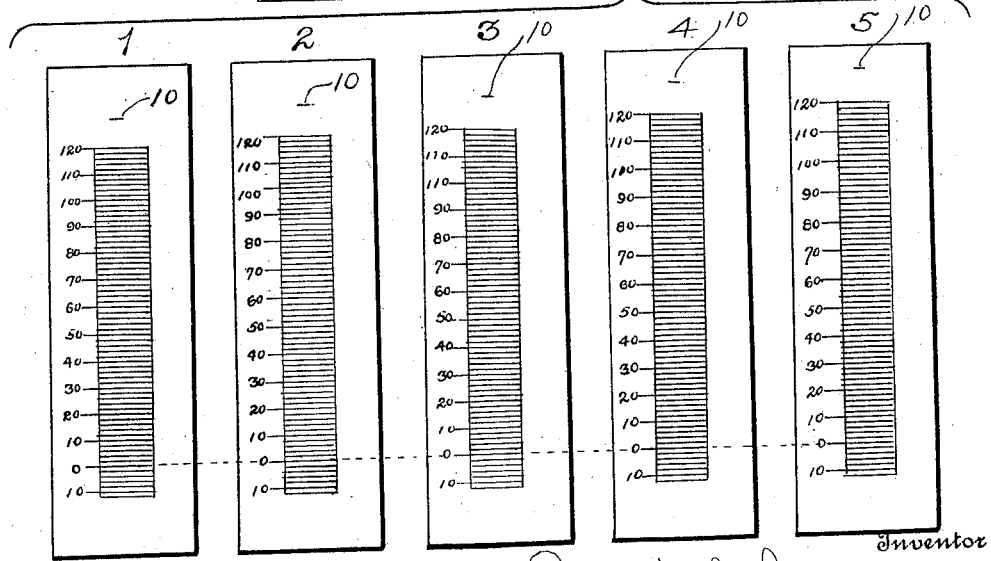
Inventor
Lee F. Chaney
By F. L. Walker
Attorney

UNITED STATES PATENT OFFICE.

LEE F. CHANEY, OF SPRINGFIELD, OHIO, ASSIGNOR TO THE CHANEY MANUFACTURING COMPANY, A CORPORATION OF OHIO.

METHOD OF SCALING THERMOMETER-TUBES AND THE LIKE.

1,391,878.     Specification of Letters Patent.     Patented Sept. 27, 1921.

Application filed December 20, 1918. Serial No. 267,705.

*To all whom it may concern:*

Be it known that I, LEE F. CHANEY, a citizen of the United States, residing at Springfield, in the county of Clark and State of Ohio, have invented certain new and useful Improvements in Methods of Scaling Thermometer-Tubes and the like, of which the following is a specification.

My invention relates to the manufacture of thermometers or like instruments and more particularly to a process or method of scaling by which the particular tubes are fitted to the graduations of the thermometer scales, it being understood that the graduations of different scales vary in extent in accordance with the variation of the bore of the thermometer tubes, the capacity of the bulbs and other irregularities of manufacture.

The object of the invention is to simplify the method and means of operation, whereby thermometer tubes may be accurately and rapidly scaled and adapted to their particular series of graduation with minimum effort and with greatest accuracy.

With the above primary and other incidental objects in view as will more fully appear in the specification, the invention consists of the mode of operation, the steps and succession and combinations thereof, the procedure, and apparatus for carrying out the process as hereinafter described and set forth in the claims.

Referring to drawings, Figure 1 represents diagrammatically the first step, namely that of "heating out". Fig. 2 represents diagrammatically the succeeding step of chilling or "freezing", by means of an ice bath to determine the "freezing" point upon the thermometer tube. Fig. 3 is a perspective view of the grading or sorting scale with a thermometer tube applied thereto. Fig. 4 illustrates a series of thermometer scales of varying dimensions to which the thermometer tubes are to be fitted according to their range of variation under different known temperatures.

Like parts are indicated by similar characters of reference throughout the several views.

In the manufacture of thermometers it has heretofore been the common practice in scaling thermometers to accommodate them to an indicator scale having graduations of corresponding degrees of variation, to first submerge the tube in an ice bath by which the "freezing" point is determined upon the tube. This is then marked by a small scratch made by a file or other instrument, and the tube is then subjected to a water bath of known temperature, the arbitrary temperature usually adopted being 62 degrees. Another mark then is made upon the tube at the point indicated by the column of liquid when subjected to this temperature. By measuring between the two marks representing "freezing" point and the predetermined temperature, and measuring the same distance upon a series of indicator scales of different relative degree or size, until one was found agreeing with the measurement between the given points, is the usual method of procedure. Theoretically, this method is sufficiently accurate. Practically, it is extremely inaccurate.

It is quite difficult to mark the hard glass tube exactly even with the top of the column of liquid. A slight deviation in the marking instrument very materially affects the accuracy of the thermometer. Likewise it is difficult to keep the water bath at even temperature and any variation of the water bath temperature destroys the accuracy of the finished thermometer. The scaling by this method is extremely tedious and laborious, requiring unusually good eye sight and an accurate hand for marking.

In carrying out my improved process, the tubes after being "heated out" at a predetermined temperature, the temperature usually arbitrarily adopted being 132 degrees, are closed off at the small end. Having been heated to the given temperature, the excess of liquid being discharged from the tube by its expansion, the column of colored liquid at such known temperature will equal the length of the tube. In other words the end of the tube becomes the gage point, and represents a given degree of temperature, viz: "heating out" temperature. Having been "heated out" and closed off, the tubes are then subjected to an ice bath by which the column of fluid is contracted to the freezing point.

There is provided an assortment of thermometer backs or graduated scales, divided into the same number of units but of slightly different extent. That is to say the scale indicated in Fig. 4 as number 1 will measure slightly less between its maximum and minimum graduations than will number 2 scale. The units or degrees of measurement of number 3 scale will be slightly greater than those of the number 2 scale, and those of number 4 scale are slightly greater than those of number 3, and so continue throughout the series. The graduated scales are provided in any number of assortment of sizes, usually from twelve to twenty different variations of graduated scales being provided.

The ordinary household scale is usually graduated to a maximum of one hundred and twenty degrees. Each of the graduated scales illustrated in Fig. 4 is provided with a gage mark 10, at a point beyond the normal range of the scale of graduations but agreeing therewith and representing the "heating out" temperature, which as before stated, is usually arbitrarily adopted as 132 degrees, which as before stated, is usually arbitrarily adopted as 132 degrees. A scale or measuring device 11 is provided as illustrated in Fig. 3, one end of which is upturned at 12, to provide a stop for the closed small end of the thermometer tube. Measuring from the mark 10 on scale 1, to the "freezing" point on such scale, the same distance is set off on the sorting or measuring device 11 by measuring from the upturned end stop 12, and marking the corresponding position of the "freezing" point. Likewise the distance from the mark 10 to the "freezing" point of the scale 2, is set off on the sorting or measuring device and is similarly indicated by a line or other mark. Each graduated scale is in turn measured from the mark 10, representing the "heating out" temperature to the "freezing" point and the different distances are set off on the sorting or measuring device 11, the distance being measured from the up-turned end stop 12, and a corresponding mark or graduation placed upon the device 11 for each one of the succeeding scales.

Upon removing a thermometer tube from the ice bath represented by Fig. 2, it is immediately applied to the sorting or measuring instrument 11 by abutting the closed small end of the tube against the up-turned end, stop 12, and noting the position of the end of the column of colored liquid, which due to its submersion in the ice bath stands at "freezing" point in relation with the markings of the scale: If the top of this column of colored liquid registers with the graduation 3, upon the measuring or sorting device 11, it is known immediately that such tube is adapted to the number 3 graduated scale. Likewise, if upon applying another tube the top of the column of colored liquid is found to register with the mark or graduation 5, upon the sorting or measuring device 11, such tube is immediately recognized as agreeing in its range of variations with the graduations upon the scale 5. By this means all error due to variation in marking and the accuracy in the marking operations, two of which are necessary in the old process, as well as the incidental strain upon the eyesight of the workmen is entirely obviated. The gage or sorting device 11 is cut away at one side to accommodate the bulbs of tubes of different length, leaving a portion of the base or bottom of the device upon which to rest the neck or stem of the tube.

It has been found in practice that much greater accuracy can be obtained by this method of scaling than by the double mark method heretofore employed, and that the scaling can be done much more rapidly and with greater ease. By this improved method one person has under normal manufacturing conditions scaled as many as nine to ten thousand thermometer tubes per day, whereas not more than fifteen hundred to two thousand tubes can be scaled by the marking process commonly employed.

It has been assumed throughout that the sealing of the tube will not materially shorten or lengthen the same, but that the length of the tube after sealing will be the same as at the time of heating out. This can be very easily and conveniently done by merely heating the end of the tube enough to close the bore without upsetting the end, or it may be accomplished by the application of sealing material. However should the method of sealing employed involve a change of dimension of the tube, due allowance must be made in the location of the gage point 10 and the distances on the measuring gage.

The descriptions and claims are to be read and interpreted with this condition in mind.

While throughout the specification "freezing point" is referred to as one scaling point, "freezing point" is only used as a matter of convenience for this description, and in practice it is convenient because of the difficulty of maintaining the conditioning bath at any other uniform temperature. It is to be understood however that where freezing temperature is mentioned, any other known or predetermined temperature may be utilized. In such event the graduations upon the gage will bear the same relation with the stop portion 12 as the predetermined or known temperature indication upon the several scales bears to the predetermined "heating out" temperature of the same scales.

From the above description it will be apparent that there is thus provided a method or process of scaling thermometer tubes and a gage member for carrying out the process, possessing the particular features of advantage before enumerated as desirable, but which is obviously susceptible of modification without departing from a principle involved or sacrificing any of its advantages. While in order to comply with the statutes, the invention has been described in language more or less specific as to the structural features of the gage means and the several steps of the process, it is to be understood that the invention is not limited to the specific details shown and described, but that the means and mode of operation herein described and shown comprise but one of several modes of putting the invention into effect, and the invention is therefore claimed with any of its forms or modifications within the legitimate and valid scope of the appended claims.

Having thus described my invention, I claim:—

1. The herein described method of calibrating thermometer tubes or like devices, comprising heating the filled but unsealed tubes to a predetermined "heating out" temperature whereby the liquid fills the tube at that temperature and the end of the tube becomes the indicating point of the column of liquid for such temperature, closing the tube, subjecting the tube to a bath of lesser known temperature to determine the indicating point of the column of liquid at such known temperature, measuring the distance between the end of the column of liquid at such known temperature and the end of the tube, and applying the tube to a scale having thereon an indication corresponding to the "heating out" temperature represented by the end of the tube, and on which the distance from such indication to the indication corresponding to said known temperature is equal to the distance from the known temperature point of the fluid column to the end of the tube.

2. The herein described process of calibrating thermometer tubes or like devices, comprising subjecting the tube to a predetermined temperature which will cause the indicating fluid therein to equal the length of the tube and determining the point at which the column of fluid indicates a known lesser temperature, measuring the distance between the end of the tube and the point of indication of such known lesser temperature and employing such distance as a gage unit for applying the tube to a scale having equidistant relation between the temperature graduation agreeing with the temperature indicated by the column of fluid when extending to end of the tube and the said known temperature point upon the scale, by registering the end of the tube with the corresponding temperature graduation.

3. The herein described process of calibrating thermometer tubes or like devices, comprising subjecting the tube to a known temperature such as will cause the indicating column of fluid therein to completely fill the tube to the end and subjecting the tube to a known lesser temperature by which a medial indicating point of the column of fluid will be determined employing the extremity of the tube as a gage point and registering the end of the tube with an indication upon a scale agreeing with the temperature indicated by a column of liquid within the tube, equal to the length of the tube, and on which the graduation indicating the known lesser temperature point will agree with the height of the column of liquid within the tube at such known temperature, substantially as specified.

4. A method of calibrating thermometer tubes and the like which consists in first subjecting the unsealed tube to a known high temperature, at which the indicating fluid fills the tube, and then to a known lesser temperature, and the distance between the heights of the column of indicating fluid at said known temperatures being then measured, and such measurement employed as a gage unit, this measurement being determined by applying the tube to a gage, having thereon a gage point and a series of graduations equal to the distance between a predetermined temperature indication, agreeing with the temperature indicated by a column of indicating fluid equal to the length of the tube, and said known lesser temperature point upon several scales of a series having temperature graduations of different extent to which different tubes are fitted.

5. A method of calibrating thermometer tubes involving the subjection of the tube to a temperature at which the column of indicating fluid completely fills the tube, whereby the indication of the column of indicating fluid when equal to the length of the tube is known, applying the tube to a gage member, having thereon a gage point to be registered with the end of the tube to be scaled, and a series of graduations each indicating a known lesser temperature of a different scale of a series of scales to which the tubes are to be fixed with which graduations the height of the column of indicating fluid of different tubes is to be registered while at such known temperature thereby indicating by the registered graduation the particular scale of the series to which the tube is adapted.

6. The herein described method of calibrating thermometer tubes and like devices, comprising "heating out" the unsealed tubes at a known temperature to discharge the excess fluid, sealing the tube, subjecting the tube to an ice bath to determine "freezing point" and applying the tube to a scale on which the distance between a point corresponding to the known "heating out" temperature and a point indicating freezing point on said scale agrees with the distance between the end of the column of fluid within the tube at the temperature of the ice bath and the end of the tube, substantially as specified.

7. A method of calibrating thermometer tubes and the like heated out at a known temperature by measuring the distance between the extremity of the tube and the indication at a known lesser temperature and applying such tube to a graduated scale having graduations marked thereon to indicate the known lesser temperature and the heating out temperature which bear the same measured relation one to the other as the tube indications at like temperatures, the end of the tube being registered with the heating out temperature graduation in applying the same to the scale.

8. A method of calibrating thermometer tubes comprising causing the tube to be completely filled by the column of indicating fluid at a known temperature, measuring the distance between the end of the tube and the height of the column of indicating fluid at a known lesser temperature, and applying the tube to a graduated scale with which the tube is to be associated, having thereon beyond the normal range of graduations a marked point corresponding with the known temperature indicated by the column of fluid equal the length of the tube width which point the end of the tube is made to register, such point being spaced a like measured distance from the graduation of the scale corresponding to the known lesser temperature.

9. A method of calibrating thermometer tubes and the like comprising subjecting the tubes to the temperature at which the indicating fluid completely fills the tube whereby the temperature indicated by such column of indicating fluid equal to the length of the tube becomes known, measuring the distance between the end of the tube and the height of the column of indicating fluid at a known lesser temperature, and applying the tube to a graduated scale having a point indicated thereon representing said known higher temperature with which point the end of the tube registers when applied to the end of the scale, said point being located in spaced relation with a graduation corresponding to the known lesser temperature equal to the measured distance between the end of the column of indicating fluid, and such known lesser temperature and the end of the tube.

10. A method of calibrating thermometer tubes and the like involving subjecting the tube to a known temperature at which the column of indicating fluid completely fills the tube and subjecting it to a known lesser temperature, and applying the tube to a calibrating gage having thereon a gage point and a series of graduations each spaced from such gage point a distance equal to the distance between the points corresponding to said two known temperatures upon each of several differently proportioned scales of a series to which the tubes are to be applied, each scale having a mark in agreement with the graduations thereof, which will correspond with the first mentioned known temperature, the application of the tube to the gage being such that the end of the tube will register with said gage point, noting the graduation registering with the fluid when at said lower temperature, selecting the scale corresponding with said graduation, and locating the tube upon said scale with the end of the tube registering with the last mentioned mark.

11. The process of calibrating a thermometer tube having therein a quantity of expansive indicating fluid, consisting in determining the temperatures at which the fluid will completely fill the tube, and applying the tube to a scale having a gage mark thereon, beyond the normal range of temperature graduations, but in accordance therewith, corresponding with the temperature at which the column of fluid fills the tube, and spaced from a selected graduation on said scale indicative of a known lesser temperature, a distance equal to the distance between the end of the column of fluid at such known lesser temperature, and the end of the tube.

12. The process of calibrating a thermometer tube having therein a quantity of expansive indicating fluid ample to fill the tube, when at a known temperature, consisting in measuring the distance between the end of the column of fluid at a lesser known temperature, and the end of the tube, and selecting a scale to which the tube is applied having temperature graduations thereon and a mark locating a point thereon, beyond the normal range of temperature graduations and bearing the same relation to the graduation upon said scale indicative of the lesser known temperature, as the end of the tube bears to the indicating point of the body of indicating fluid at said lesser known temperature, the end of the tube being registered with said locating point, in applying the tube to said scale.

13. The process of calibrating a thermometer tube having therein a column of expansive indicating fluid, consisting in heating out the contents of the tube at a known temperature, measuring the extent of the tube beyond the end of the column of indicating fluid at a selected lesser temperature, and selecting a scale to which the tube is to be applied having thereon a prelocated location point beyond the normal range of temperature graduations of the scale and bearing the same spaced relation with any selected temperature graduation of the scale as the spaced relation of the end of the tube with the end of the column of fluid at the temperature corresponding to such selected graduation.

14. The hereindescribed process of calibrating thermometer tubes or like devices having a column of expansive fluid therein, comprising determining the temperature at which the fluid fills the tube, measuring the distance between the end of the tube and the end of the column of expansive fluid at a known lesser temperature, prelocating upon a thermometer scale a location point beyond the normal range of graduations having the same spaced relation with the indication point upon the scale corresponding to said known lesser temperature as the end of the tube bears to the end of the column of fluid at said known temperature and in agreement with the scale of graduation to indicate the temperature at which the fluid fills the tube and applying the tube to said scale with the end of the tube in registry with said location point.

In testimony whereof I have hereunto set my hand this 5th day of December, A. D. 1918.

LEE F. CHANEY.

Witnesses:
W. F. HEROLD,
J. E. WARD.